No. 824,289. PATENTED JUNE 26, 1906.
S. DUNKELBERGER.
BAND CUTTER AND FEEDER.
APPLICATION FILED MAR. 17, 1904.

Witnesses
Howard D. Orr.
B.G. Foster

Samuel Dunkelberger, Inventor,
By E.G. Siggers
Attorney

No. 824,289. PATENTED JUNE 26, 1906.
S. DUNKELBERGER.
BAND CUTTER AND FEEDER.
APPLICATION FILED MAR. 17, 1904.

Witnesses
Jas. K. McCathran
B.G. Foster

Samuel Dunkelberger, Inventor
By C.G. Siggers
Attorney

No. 824,289. PATENTED JUNE 26, 1906.
S. DUNKELBERGER.
BAND CUTTER AND FEEDER.
APPLICATION FILED MAR. 17, 1904.

Samuel Dunkelberger, Inventor

Witnesses
Jas. L. McCathran
B.H. Foster

By C.G. Siggers
Attorney

UNITED STATES PATENT OFFICE.

SAMUEL DUNKELBERGER, OF NEWTON, KANSAS.

BAND-CUTTER AND FEEDER.

No. 824,289. Specification of Letters Patent. Patented June 26, 1906.

Application filed March 17, 1904. Serial No. 198,605.

*To all whom it may concern:*

Be it known that I, SAMUEL DUNKELBERGER, a citizen of the United States, residing at Newton, in the county of Harvey and State of Kansas, have invented a new and useful Band-Cutter and Feeder, of which the following is a specification.

This invention relates particularly to that class of band-cutters and feeders illustrated, described, and claimed in a copending application filed October 11, 1902, Serial No. 126,959, and embodies several improvements thereover.

One of the improvements relates to the means for supporting the float, or, in other words, the actuating device for the mechanism that varies the feed of the conveyer. In the apparatus set forth in the prior application the band-cutters operate through the said float and in advance of the same to cut the material banked thereagainst. While this is an important feature, it has been found that in order to obtain the highest results the field of operation of the cutters in advance of the float should be varied accordingly as the material is wet and heavy or light and dry. Therefore the object is to provide a float which is adjustably supported, so that the said field of operation can be enlarged or contracted.

A very important feature also resides in several improvements made in the speed-varying mechanism for the conveyer, which means is entirely reliable and at the same time extremely simple.

Another feature of the invention relates to certain improvements in the retarding means which will properly feed the material to the threshing-cylinder and will not choke itself.

Still another feature relates to improvements in the automatic means for throwing the conveyer into and out of operation, whereby the friction and consequent wear upon the parts is greatly reduced.

The preferred form of construction is illustrated in the accompanying drawings, wherein—

Fig. 8 is a sectional view on the line 8 8 of Fig. 7.

Similar reference-numerals indicate corresponding parts in all the figures of the drawings.

The general character of the machine is somewhat similar to that illustrated in the aforementioned copending application.

The frame or casing is designated generally by the reference-numeral 10 and is provided with the usual feed-trough 11, having a division-board 12, said division-board in the present instance being supported by a bracket 13, secured to one of the cross-bars 14 of the frame. Through this trough operates a conveyer in the form of an endless apron or belt that consists of side chains 15, connected by cross-slats 16, said slats being provided with rearwardly-projecting teeth 17, extending from the corners of the slats. The chains 15 pass over suitable idlers 18, and the apron is driven by a shaft 19, arranged across the lower rear end of the conveyer. Journaled in the upper portion of the frame or casing is a crank-shaft 20, constituting a main driving-shaft for the band-cutter and feeder and having its intermediate portion bent to form a plurality of crank-arms 21, that extend in various directions. This crank or driving shaft projects beyond the opposite sides of the casing and is provided at one end with a main driving-pulley 22, the other end supporting the speed-varying mechanism and speed-governor, as is hereinafter more fully described.

The end of the shaft 20 projecting from the side of the casing opposite that carrying the driving-pulley 22 has secured thereto a driving element in the form of a friction-disk 23, said disk being provided with a hub through which the shaft 20 passes, and the hub carrying a set-screw 24, that engages said shaft. A driven disk 25 is loosely journaled and has a sliding movement upon the shaft 20 outside the driving-disk 23, being provided with an elongated hub 26, through which said shaft passes. The driven disk 25 is yieldingly forced toward the driving-disk by means of a spring 27, coiled upon the outer end of the shaft 20 and bearing against a collar 28, slidably mounted on the shaft, said collar in turn bearing against the outer end of the hub 26. The collar 28 is held against movement by a key 29, slidably engaging in a keyway 30 in the shaft 20, and the tension of the spring may be varied by suitable nuts 31, threaded upon the free end of the shaft. An oil-cup 32, secured to the hub 26, supplies lubricant to the bearing, as will be evident by reference to Fig. 4.

Figures 6, 7, 9, 15, 16, 17, 18:
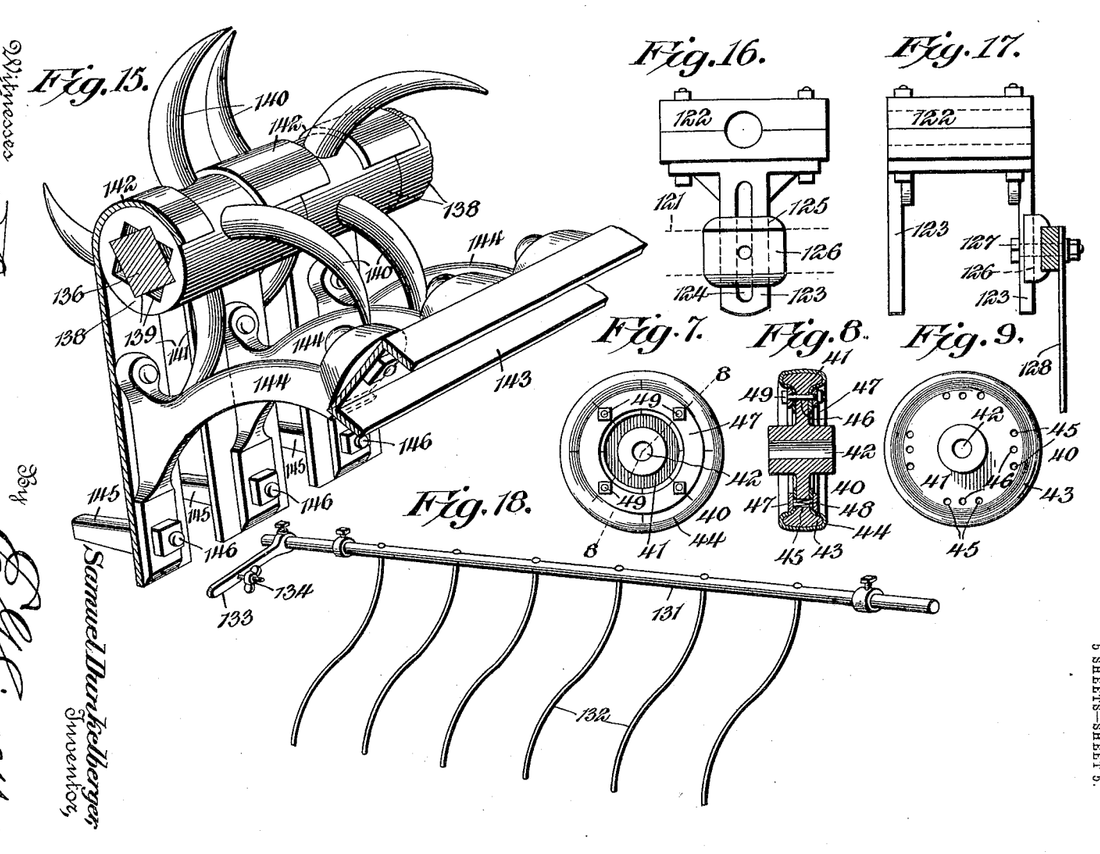
Fig. 7 is a side elevation, on a slightly-enlarged scale, of the friction-wheel.
Fig. 9 is a side elevation of the body of the wheel with the tire and fastening means for said tire removed.
Fig. 15 is a detail perspective view of a portion of the retarder.
Fig. 16 is a side elevation of one of the devices employed for connecting the cutter-bars to the crankshaft.
Fig. 17 is an end elevation of the same.
Fig. 18 is a detail perspective view of the throat-controlling means or deflector employed.

Located above the friction-disks 23 and 25 are supporting-brackets, each comprising a stationary section 33, bolted or otherwise secured to an adjacent portion of the frame, and a movable section 34, having a pivotal connection 35 with the free end of the stationary section. The movable sections of the brackets carry at their free ends upright sleeves 36, depending between the disks 23 and 25 on opposite sides of and at substantially equal distances from the axes of rotation of said disks, which axes, it will be apparent, are coincident. The sleeves constitute supporting-journals for upright rock-stems 37 passing therethrough, the lower ends of the stems carrying yokes 38 and the yokes constituting supports for transverse axles 39. Loosely journaled on the axles 39 are friction-wheels 40, the preferable construction of which is illustrated in Figs. 7, 8, and 9. A cast-metal body 41 is employed, having a central opening 42, that receives the axle, this body being provided with an annular rim 43. A tire 44, of leather or other suitable material, incases the rim 43 and has its margins arranged against the opposite faces of the web of the body between the hub and the rim, which web is preferably provided with sets of openings 45 and 46. Holding-rings 47 are placed over the margins of said tire and have spurs 48, (shown in Fig. 8,) which spurs engage in the openings 45 and pierce the said margins. The rings are held in place by bolts 49 passing therethrough and through the central openings 46, thereby also passing through the tire and assisting in fastening the same in place. This construction, it will be apparent, is very durable and strong. At the same time when the tire becomes worn or should it become injured it may be readily replaced by a new one without the necessity of an entire new wheel. The friction-wheels 40 are located between the friction-disks 23 and 25 on opposite sides of their axes of rotation and with the opposite portions of their peripheries in frictional engagement with the adjacent faces of the disks. As said wheels are carried by the stems 37, it will be evident that each may be swung on an axis that lies between the disks transverse to and intersecting the axis of rotation of said wheel. The swinging movements of these wheels is indicated clearly in Fig. 4. When the portion in engagement with one disk is moved toward the periphery thereof, the opposite portion in engagement with the opposite disk is moved toward the hub or axis of the latter. In order therefore that these wheels may properly engage the said disks throughout their swinging movements, the disks are provided in their adjacent inner faces with annular grooves 50, transversely concave and having their cross-sectional contours concentric to the axes upon which the wheels swing, all of which will be evident by reference to Fig. 4.

Figure 1:
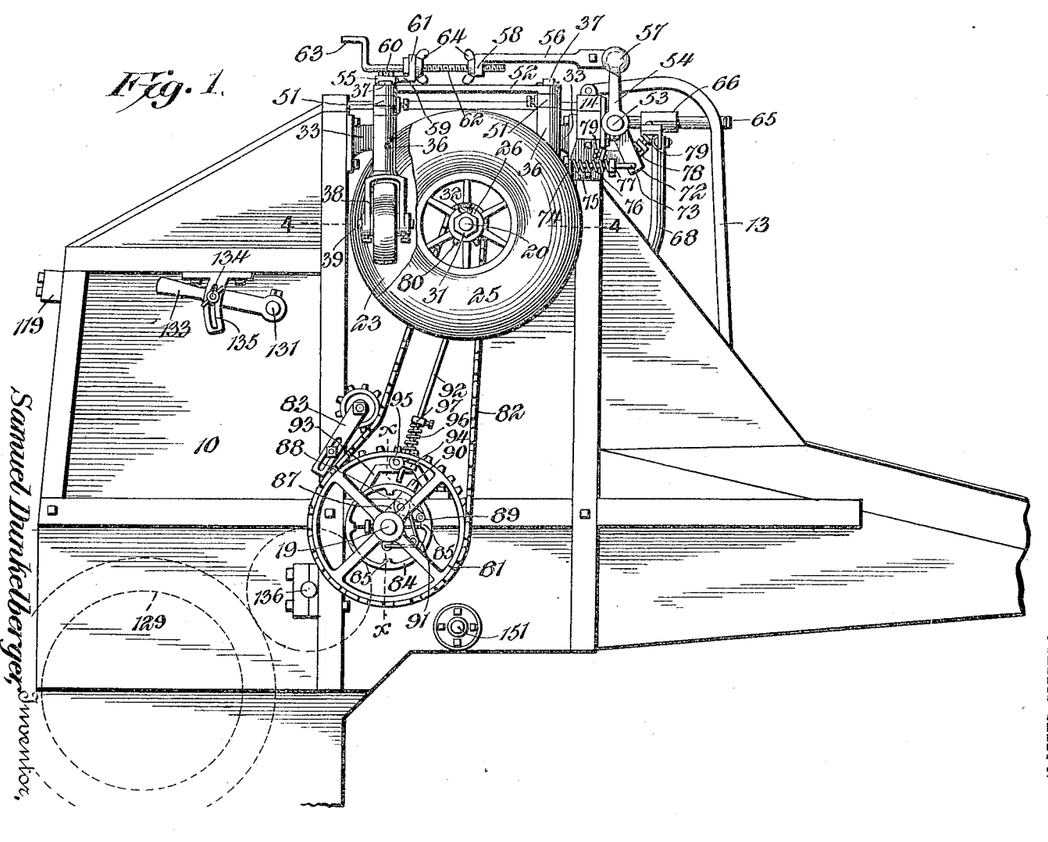
Figure 1 is a side elevation of a portion of the band-cutter and feeder.
Figure 2:
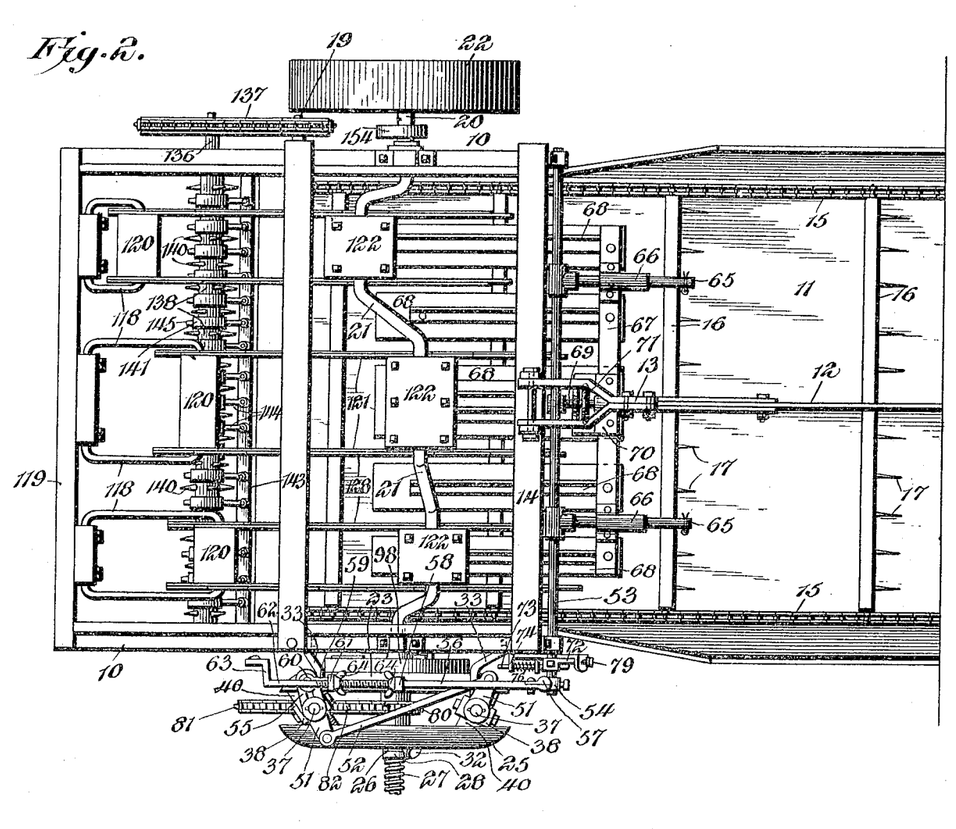
Fig. 2 is a top plan view of the same.
Figures 3, 13:
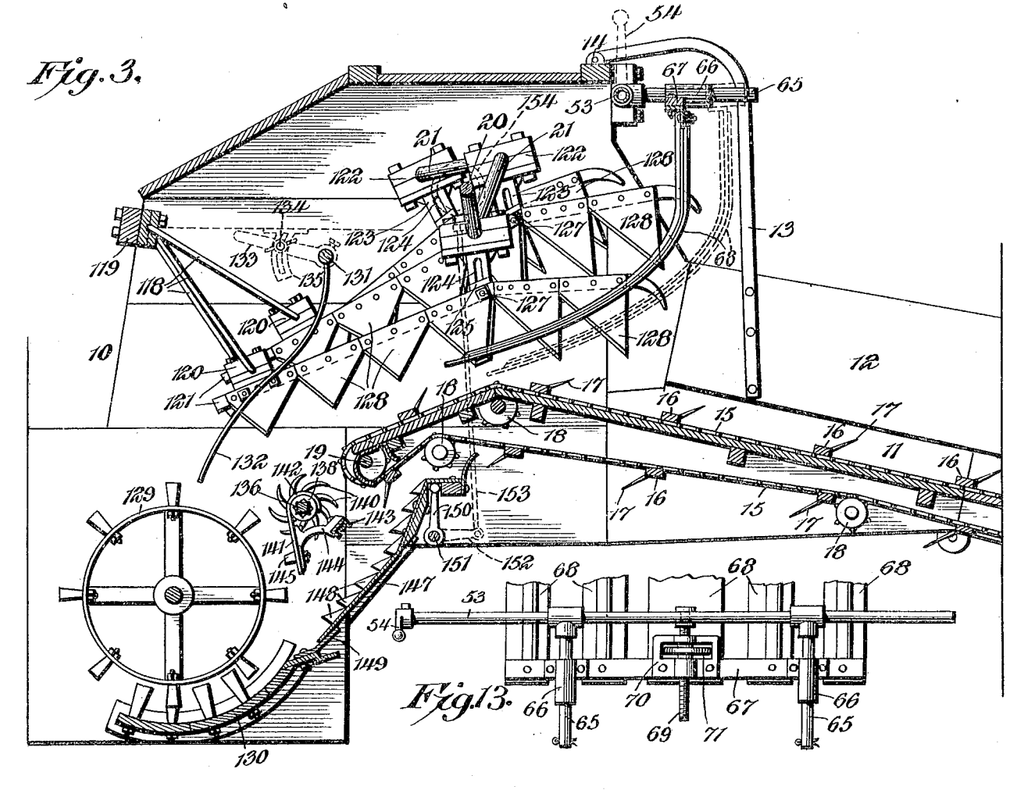
Fig. 3 is a vertical longitudinal sectional view.
Fig. 13 is a detail top plan view of the supporting means for the float.
Figures 4, 5, 6, 10, 11, 12, 14:
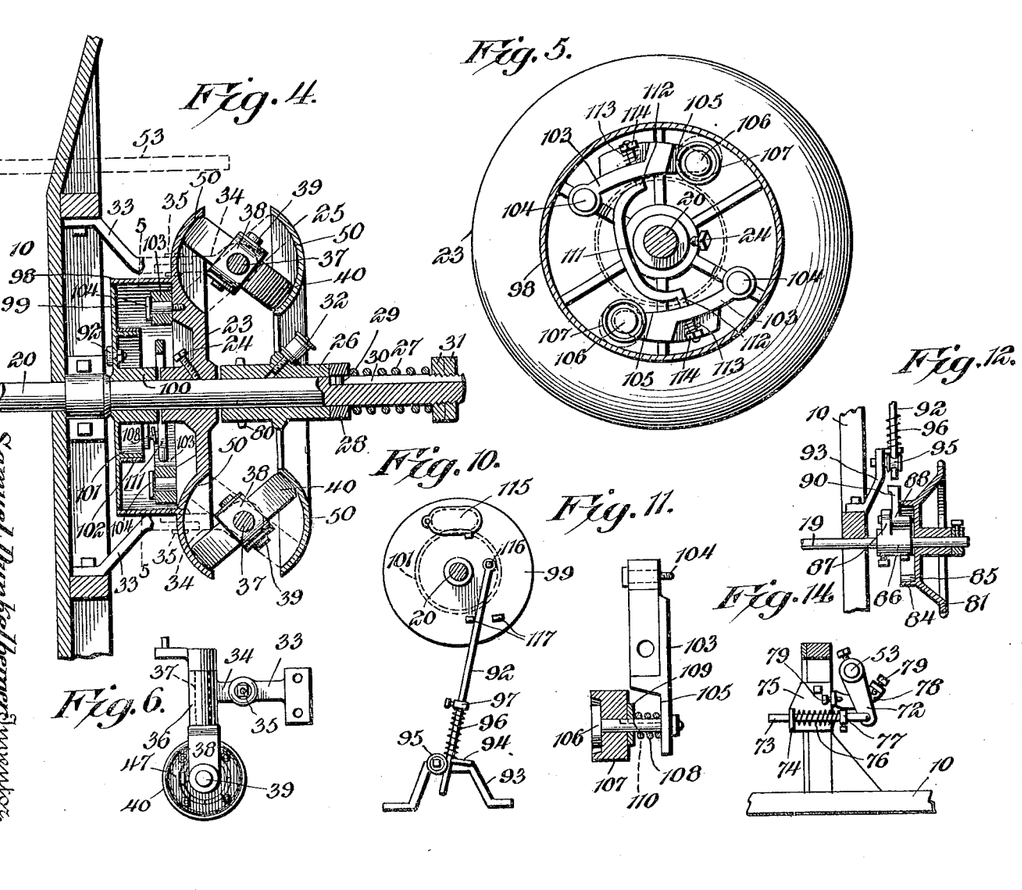
Fig. 4 is a horizontal sectional view taken substantially on the line 4 4 of Fig. 1.
Fig. 5 is a sectional view taken on the line 5 5 of Fig. 4.
Fig. 6 is a detail side elevation of one of the friction-wheels and its support.
Fig. 10 is a rear elevation of the loose element of the speed-governor and the clutch-tripping device.
Fig. 11 is a detail view, partly in section, of one of the centrifugal arms of the governor.
Fig. 12 is a detail sectional view through the clutch, taken substantially on the line *x x* of Fig. 1.
Fig. 14 is a detail view of the means for yieldingly urging the float downwardly toward the conveyer.

For the purpose of simultaneously moving the engaged portions of the friction-wheels toward the axis of one disk and toward the periphery of the other it is necessary that said wheels be moved in opposite directions. This is accomplished in the present embodiment of the invention in the following manner: The upper ends of the stems 37 have secured thereto oppositely-extending arms 51, and said arms are connected at their free ends by a link 52. An actuating rock-shaft 53 is journaled to the frame above the conveyer and carries at one end an upstanding arm 54, which is attached, by means of an extensible link, to an arm 55, fastened to one of the upright stems 37. The extensible link is illustrated particularly in Figs. 1 and 2 and consists of a section 56, having a ball-and-socket joint 57 at one end with the upstanding arm 54, and having at its other end an offset ear 58. Another section 59 has a bolt connection 60 with the arm 55, said bolt connection being adjustable in a slot in the arm toward and from the stem 37. This section 59 is also provided with an offset ear 61, and through the ears 58 and 61 is passed a screw-stem 62, having a handle-crank 63 at one end, said stem 62 having a threaded engagement with the ear 58 and being revoluble in the ear 61. Jam-nuts 64 serve to prevent the accidental movement of the stem. The rock-shaft 53, to which reference has already been made, constitutes the support for a float, and by referring particularly to Fig. 13 it will be seen that said rock-shaft carries spaced forwardly-projecting guides in the form of rods 65. Upon these guides boxings 66 are slidably mounted. Said boxings are connected by a transverse supporting-bar 67, which is disposed above the conveyer-apron and to which are attached depending rearwardly-curved float-arms 68, said arms being spaced apart. It will be seen that the cross-bar 67 is movable toward and from the rock-shaft, and in order to secure this movement, as well as to hold the cross-bar against the same, a screw-shank 69 may be employed, which shank is attached to the rock-shaft and projects from a boxing 70, fastened to the cross-bar. A hand-wheel 71, located in the boxing 70, has a threaded engagement with the shank 69, and consequently by turning said wheel in one direction or the other the cross-bar will be moved toward or away from the rock-shaft, and float-arms will be carried with it. This is indicated in Fig. 3. Means are also employed for yieldingly urging the float downwardly toward the conveyer. This means is illustrated in Figs. 1 and 14. The rock-shaft 53 has at one end a depending arm 72, to the lower end of which is pivoted a stem 73, the free end of said stem being slidably mounted in an eye 74, forming part of a bracket 75, secured to the frame of the machine. A spring 76 is coiled upon the stem 73 and bears at one end against the eye 74, the other end bearing against an adjustable collar 77, secured to the stem. The movement of the crank-arm 72, and consequently the movement of the rock-shaft 73, is limited by a curved keeper 78, having adjustable stop-screws 79 located in the path of movement of the arm 72, and thereby constituting abutments for the same.

The driven disk 25 of the speed-varying mechanism is provided with a sprocket-wheel, preferably formed of teeth 80, secured to the inner portion of the hub 26 between the two disks, and loosely journaled upon the conveyer-shaft 19 is another sprocket-wheel 81, the two wheels being connected by a chain 82, that may be tightened by a suitable tightener 83. The sprocket-wheel 81 constitutes the loose member of a clutch and is provided with an annular rim 84, arranged concentrically to the shaft 19 and having on its inner side shoulders or teeth 85. The other or fixed member of the clutch consists of a hub 86, secured to the shaft 19 inside the wheel 81 and having an outstanding lug 87, to which is pivoted a dog 88. The dog is substantially in the form of a bell-crank lever, having a roller 89 at one end, as illustrated in Fig. 1, and arranged to engage behind any one of the shoulders 85 of the flange 84. The other arm 90 of the dog projects outwardly beyond the flange 84 and at one side of the same. The dog is urged into engagement with the shoulders 83 by means of a suitable spring 91. It is arranged to be held out of such engagement, however, by means of a detent in the form of a rod 92, slidingly mounted on the side of the frame. The preferable manner of supporting and guiding the lower end of this rod is illustrated in Fig. 10. A guide-bracket 93 is secured to the frame and has an outstanding lug or projection 94, against which the detent-rod 92 slides. On the side of the rod opposite to the lug and preferably upon the bracket is an antifriction-roller 95. A spring 96, coiled upon the rod and bearing at its lower end against the lug 94, while its upper end bears against an adjustable collar 97, secured to the rod, serves to normally elevate said rod, so that its lower end is out of the path of movement of the arm 90 of the dog. At the same time by depressing the rod 92 the said lower end will be located in the said path of movement, and consequently will engage the dog and throw it out of engagement with the shoulders 85 of the sprocket-wheel 81.

Automatic means in the form of a centrifugal speed-governor is employed for moving the detent-rod 92. This governor is illustrated in detail in Figs. 4, 5, 10, and 11. The driving element or disk 23 of the speed-varying mechanism constitutes the driving element of the governor, and the driving-shaft 20 also constitutes a support for this governor. The construction employed is as follows: The driving-disk 23 is provided with an annular flange 98, projecting from its inner side, and inclosed within the free margin of said flange is a loosely-mounted governor element comprising a disk 99, having a hub 100, through which the shaft 20 passes. The disk 99 carries an annular rib or flange 101, inclosed by the flange 98 of the driving member and spaced therefrom, said flange 101 having a friction-surface 102, formed of leather or other suitable material. Journaled to the driven disk 23 within the flange 98 are centrifugal arms 103, each pivoted at one end by a bolt 104 and having their free ends preferably cut away, as shown at 105. Said free ends carry headed journal-pins 106, upon which are rotatably mounted friction-wheels 107, adapted to frictionally engage against the heads of the pins 106 and being urged into such engagement by coiled springs 108, located on the stems and interposed between the arms and washers 109, mounted on said stems against the friction-wheels. The washers 109 are held by keys 110 against revolution with the wheels. A yielding connection is employed between the arms, said connection being in the form of a yoke 111, curved to pass about the shaft 20 and having alined terminals 112, that pass through the arms, springs 113 being located on the outer ends of the yoke and bearing against the arms to urge the same inwardly. The tension of these springs can be varied by means of nuts 114, threaded upon the ends of the yoke. Under normal conditions the friction-wheels bear upon the friction-surface 102 of the flange 101 of the disk 99. Under centrifugal force it will be apparent that they will swing outwardly, and thereby disengage the surface, their outward movement being limited by their engagement with the flange 98 of the driving member 23. Access to the interior of the governor is obtained through a suitable opening formed in the disk 99 and covered by a hinged plate 115. (Shown in Fig. 10.) Thus the adjustment of the various inclosed elements can be secured. The detent-rod 92 has its upper end pivoted to the disk 99, as shown at 116, preferably at one side of the shaft 20. The movement of this disk is limited by a pair of spaced stop projections 117, carried thereby, located on opposite sides of the detent-rod 92, but arranged to engage said rod, as will be evident by reference to Fig. 11.

The band-cutting means is very analogous to that described in the former application. Links 118 are supported at their upper ends upon the cross-bar 119 of the frame, their lower ends being journaled in boxings 120, carried by the rear ends of the cutter-bars 121. The crank-shafts 21 are provided with sectional boxings 122, the lower of said sections having depending guide-plates 123, provided with longitudinal slots 124. Clip-plates 125, having oppositely-extending seats 126 in their opposite faces, are carried by the plates 123, said plates being located in the upright seats of the clips. The front portions of the cutter-bars are arranged in the transverse seats, and bolts 127, passing through the bars, the clips, and the slots of the plates, serve to secure the same together and at the same time permit the vertical adjustment of the cutter-bars. Cutting-blades 128 are secured to the bars, the foremost of said blades thus having gyratory movements over the conveyer-apron through the spaces between the float-arms 68 and in advance of the same. By the term "gyratory" is meant the movement imparted to the knives mounted on the above-described type of bars, wherein certain portions are carried about in substantially upright circular paths without, however, being rotated, while other portions are movable back and forth.

The threshing-cylinder and the concave are designated, respectively, 129 and 130 and are located in rear of and spaced from the rear end of the conveyer-apron, being disposed below the same. A deflector is employed comprising a rock-shaft 131, journaled in the frame 10 above the cutter-bars between the crank-shaft and links 118. This rock-shaft is provided with downwardly and rearwardly extending tines 132, that are preferably reversely curved, the lower ends of the tines being located above the cylinder and in spaced relation to the rear end of the conveyer and retarder, said tines also extending between the cutter-bars. The rock-shaft and consequently the tines are adjusted by a crank-arm 133, located opposite the frame and normally secured against movement by a suitable set screw or nut 134, engaging a curved slotted bracket 135.

Interposed between the rear end of the conveyer and the cylinder is a retarding device which is preferably constructed as follows: An angular shaft 136 is employed which has a sprocket connection 137 with the shaft 19 of the conveyer. Upon the shaft 136 are placed a plurality of hub-sections 138, secured in any suitable manner, each having a plurality of notches 139 so arranged that different sets will receive the corners of the shaft, and consequently said hubs may be disposed in different relation. Each hub is provided with a plurality of radially-disposed projecting rearwardly-curved fingers 140, and thus by arranging the hubs with the shaft alternately in different sets of notches the fingers will assume a staggered relation, as shown in Fig. 15. A guard extends over the rear lower portion of the retarding device and consists of upright plates 141, the upper ends of which are in the form of hooks 142, that rest upon the hubs 138 between the fingers, said fingers thus operating between the plates, the spaces being preferably just sufficient to allow the passage of the same. A transversely-disposed channel-bar 143, secured to the casing, is arranged in rear of the shaft 136, and this channel-bar is connected with the plates by independent heel braces or brackets 144, preferably of less width than the plates. The means for securing the lower ends of these brackets to the plates is in the form of teeth 145, projecting to points contiguous to the teeth of the threshing-cylinder and having shanks 146, which pass through the plates and brackets. It is to be observed that the teeth have their opposite faces disposed in convergent relation, one being rounded, the other flat, and said faces being reversible either the round or flat face may be brought uppermost.

In order to prevent the escape of grain and straw between the front end of the concave and the rear end of the conveyer, a shake-pan 147 extends between the two, having inwardly-projecting teeth 148. The lower end of this shake-pan slidably rests upon a suitable flange 149, disposed in front of the concave, while its upper end is supported upon upstanding arms 150, carried by a rock-shaft 151, located below said upper end. This rock-shaft extends through one side of the casing or frame and has another offset arm 152, to which a link 153 is pivoted, this link having a strap 154 at its upper end that embraces a suitable cam 155, carried by the main driving or crank shaft 20, just inside the pulley 22, as illustrated in Fig. 2.

The operation of the machine may be briefly outlined as follows: Assuming that the belt connects the threshing-cylinder shaft and the pulley 22 and that the separator is just starting, it will be apparent that the main driving-shaft 20 will be rotated and that the cutting mechanism will consequently operate. The rotation of the driving-shaft of course effects the rotation of the driving element or disk 23, which in turn imparts movement to the friction-wheels 40. Said wheels will thereby drive the driven disk 25 in a direction opposite to the direction of movement of the driving element 23. The driven disk 25 in turn imparts movement through its sprocket-wheel 80 and the chain 82 to the gear-wheel 81, loosely mounted on the driving-shaft 19 of the conveyer. The revolution of the gear-wheel 81 will not effect the movement of the shaft 19, however, for the following reasons: The springs 113 of the speed-governor will urge the arms 103 toward each other, and thus hold the rollers 107 in engagement with the flange 101 of the loose member. Consequently said loose member will be partially revolved by said governor, moving the detent-rod 92 downwardly until such movement is stopped by the lug 117 engaging with the rod. This downward movement, as already explained, carries the lower end of the rod 92 into the path of movement of the dog 88 and as soon as the outer end of the dog strikes the detent the roller 89 will be disengaged and held disengaged from the shoulders 85 of the sprocket-wheel, said wheel, therefore, being freely revoluble upon the shaft 19. As soon, however, as the speed of the crank-shaft reaches a predetermined rate the jaws or arms 103 of the governor, under the influence of centrifugal force, will fly outwardly, thereby causing the rollers 107 to disengage from the flange 101. The movable member 99 of the governor, being thereby freed from the driven rotating member, will, under the influence of the spring 96, be partially revolved in a reverse direction to the direction of movement of said driven rotating member until the other stop 117 engages the detent-rod. This movement also effects the elevation of the rod, thereby disengaging the lower end from the dog 88, as shown in Fig. 12. Immediately, said dog will, under the influence of its spring 91, engage one of the teeth 85 of the sprocket-wheel, and the shaft 19 being thus clutched to said sprocket-wheel will revolve with it, consequently securing the movement of the conveyer-apron. If material has now been pitched upon the apron, it will be conveyed directly beneath the float and be operated upon by the cutters, which will not only sever the bands, but will also distribute the material evenly over the rear end of the apron prior to its passage to the retarder. This retarder will present said material evenly to the threshing-cylinder, and the threshing-cylinder, coacting with the lower set of teeth 145, serves to comb out the straw before it is carried into the concave. If, however, a large amount of material be thrown upon the conveyer or the straw is tangled, wet, and soggy, so that the cutters will not operate rapidly enough to take care of the same, the mass will bank against the float-arms 68, and it will therefore be evident that said arms will swing rearwardly. This causes a movement of the rock-shaft, and consequently a forward movement of the extensible link, comprising the sections 56 and 59. The result is a simultaneous swinging movement of the stems and the friction-wheels. The peripheral portions of said wheels in engagement with the driving-disk 23 move toward the axis thereof, while the diametrically-opposite portions move toward the periphery of the driven disk. The result is a slower movement on the part of said driven disk, and therefore a corresponding slower movement of the conveyer. As soon, however, as the abnormal supply has been disposed of the float-arms will under the action of gravity and the spring 76 drop to their normal position, the friction-wheels each return to their original relation with respect to the driving and driven disks, and the relative movement of the conveyer-apron is again increased.

In the operation of the machine it will be noted that the cutter-bars and front blades act between the float-bars and in advance of the same, said float-bars therefore also constituting strippers for the blades. At the rear ends of the cutter-bars are located the deflector-tines, which, in connection with the rear portion of the conveyer and the retarder, form a throat leading to the cylinder. The size of this throat can be varied as desired by adjusting the tines, as will be evident.

After the straw has passed through the contracted space formed between the retarder and the cylinder-teeth the tendency of such cylinder is to discharge said grain and straw violently away from itself, this effect being caused partially by an air-current formed by the cylinder and partially by the centrifugal force of said cylinder. The deflector-plates 141 form, in effect, a diaphragm to prevent this outward movement of the material and to direct the same toward the concaves, at the same time maintaining the straw principally in the path of travel of the cylinder-teeth. The teeth 145 are located between the teeth of the cylinder and form, in effect, a primary concave. Excessive quantities of grain torn from and passed through the retarder are detained in the space between the deflector-plates and the shake-pan, the latter rapidly and evenly feeding this surplus into the cylinder and the concaves. Consequently the grain passed through this system of devices is loosened up in the heads of the straw and partly threshed before the same reaches the concaves, allowing the teeth of the latter to be further from the cylinder, avoiding the breaking of grain, and consuming less power.

Among the advantages for the structure the following may be enumerated: It is well known that the most careless and inexperienced workmen are employed to pitch the grain to the conveyer. The consequence is that the bundles are thrown onto the conveyer in any position and in any form. Moreover, bunches of headed grain grown together, tops of stacks, and tough bottoms are rolled up and thrown upon the said conveyer. All these different conditions which are met with in practice are provided for and overcome in the present structure. Surplus grain is retarded before it enters the feeder proper and no soiled bunch or wad of grain can possibly enter between the concaves and cylinder without being first thoroughly separated and thinned out to such a degree as is necessary to efficient threshing. In bad grain the combined float and stripper is adjusted away from the rock-shaft or, in other words, toward the front ends of the knife-bars, thus allowing the grain to have earlier contact with the lower ends of the float-arms 68. In this position said arms will not have to raise as high from the conveyer to move the arm 54 the same distance as when the float is set back toward the rock-shaft. It is believed that this will be clear by referring to Fig. 3, wherein the forward position of the float is indicated in dotted lines. As a result the conveyer and retarder reach the slowest speed on a smaller quantity of grain than when the float is in its rearmost position. It will also be apparent that by adjusting the connection 60 between the link and the crank-arm 55 toward or from the stem to which said arm is secured the friction-wheels will move a greater or less distance with relation to the movement of the float. By shortening the link connection between the arm 55 and the arm 54 the relation of the friction-wheels can also be changed, so that they will not travel the full distance on the faces of the disks, and the conveyer and retarder may thus be prevented from reaching a high speed, even when the float is down to its lowest position with respect to the conveyer. The result of this arrangement is a feeder that is very sensitive in its action and at the same time is entirely automatic. The deflector disposed in the peculiar relation shown and described is also an important feature in the government of the feed. When the grain is wet, heavy, and in bad condition, the tines 132 are moved toward the retarder, thus contracting the throat and preventing small wet bunches of grain which may pass beneath the float from overloading the retarder and being jerked through the concaves by the cylinder. With this deflector it will be apparent that the grain must pass the said retarder and engage the same.

Now as the retarder rotates very slowly the rapidly-revolving cylinder-teeth will have to take the material therefrom, and consequently comb it out evenly before it reaches the concave. Another feature to be noted at this point is the fact that the space beneath the retarder and in rear of the shake-pan constitutes a holder or reservoir for any oversupply should such oversupply pass the retarder. The material can here bank up to a considerable extent until there is space for it to pass into the concaves, whereupon the shake-pan will feed it thereinto. The machine also feeds equally even in threshing dry grain that is in the best possible condition, as it only requires the parts above described to be reversed, the throat opened, the knife-bars raised to some extent with respect to the crank-shaft, and the float set back, so as to vary the speed. On a comparatively heavy flow of grain, however, the adjustments may likewise be made to the friction-wheels, so that the speed of the conveyer can be changed from its lowest to its highest rate. Another point to be noted is the fact that the grain is continuously advanced both at the bottom and at the top, and no part of the machinery is entirely stopped by the surplus grain. The conveyer is at all times moving, and the knives also act as feeders. At the same time the teeth 17 of the conveyer-slats serve to prevent the bundles being thrown beneath the float-arms without having their bands severed and the material thoroughly separated. The specific construction of the retarder has certain important advantages. By having the guard-plates 141 as close together as possible very little straw can be thrown by the cylinder between the same; but any which does find its way therethrough will not bank in the frame, as the spaces between the braces 144 are comparatively great and the rear side of the retarder is entirely open. The primary concave teeth at the lower end also act as holders for the grain after it has passed the rotating fingers. Indeed, experiments have shown that the retarder in itself will coact with the cylinder to thoroughly open and spread a bundle of grain. A tough bunch having the band uncut has been placed on the said retarder, and it has been found that the cylinder will break the band, distribute the same, leaving part in the teeth, part in the space in rear of the shake-pan, and the balance will be fed to the concaves. Furthermore, the retarder has thereupon delivered the material carried by it to the cylinder, and the shake-pan has in like manner fed its quota into the concaves.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a band-cutter and feeder, the combination with a conveyer, of means for controlling the movement of the conveyer including a rock-shaft carrying a guide that is disposed transversely of said rock-shaft, actuating mechanism for the rock-shaft comprising straw-engaging means adjustably movable on the guide toward and from the rock-shaft, and means for securing the straw-engaging means against its adjustable movement.

2. In a band-cutter and feeder, the combination with a conveyer, of means for controlling the movement of the conveyer including a rock-shaft, a guide-rod rigidly extending therefrom, straw-engaging means adjustably movable on said guide-rod toward and from the rock-shaft, and means for securing the straw-engaging means against such adjustable movement.

3. In a band-cutter and feeder, the combination with a conveyer, of band-cutters operating over the conveyer, mechanism for driving the conveyer at variable rates of speed, and means for effecting the movement of the said speed-varying mechanism, said means including a straw-actuated device movably suspended over the conveyer and having the band-cutters operating therethrough and in advance thereof, said device being adjustable bodily toward and from the front end of the conveyer and the front limit of movement of the said band-cutters.

4. In a band-cutter and feeder, the combination with a conveyer, of gyratory band-cutters operating over the conveyer and having fixed paths of movement, mechanism for driving the conveyer at variable rates of speed, and means for effecting the variation of the said speed-varying mechanism, said means including a movable support located over the conveyer and connected to the speed-varying mechanism, and a straw-actuated device secured to the support, said device being bodily adjustable toward and from the support to vary its position with respect to the front limit of movement of the band-cutters, said cutters operating through the said device and in advance thereof.

5. In a band-cutter and feeder, the combination with a conveyer, of band-cutting mechanism, and means for controlling the movement of the conveyer including a rock-shaft located over said conveyer, and straw-engaging means adjustably suspended from the rock-shaft and movable toward and from the axis of movement thereof, said means being disposed over the conveyer and swinging toward and from said conveyer with said rock-shaft as an axis of the swinging movement.

6. In a band-cutter and feeder, the combination with a conveyer, of means for controlling the movement of the conveyer, said means including a rock-shaft, swinging float-arms adjustably suspended from the rock-shaft, the axis of the swinging movement of said arms being coincident with the axis of the rock-shaft, said arms being movable toward and from the rock-shaft, and means for moving the arms toward and from the rock-shaft.

7. In a band-cutter and feeder, the combination with a conveyer, of means for controlling the movement of the conveyer, said means including a rock-shaft having projecting guides, boxes slidably mounted on the guides, a cross-bar connecting the boxes, and float-arms secured to the cross-bar and suspended therefrom over the conveyer.

8. In a band-cutter and feeder, the combination with a conveyer, of means for controlling the movement of the conveyer, said means including a rock-shaft having projecting guides, boxes slidably mounted on the guides, a cross-bar connecting the boxes, float-arms secured to the cross-bar and suspended therefrom over the conveyer, and means connecting the cross-bar and rock-shaft for relatively moving the same.

9. In a band-cutter and feeder, the combination with an endless conveyer-apron, of means for controlling the movement of the conveyer-apron, said means including a rock-shaft journaled thereover, guides secured to the rock-shaft, a cross-bar slidably supported on the guides, an adjusting-screw connecting the cross-bar and rock-shaft, depending rearwardly-extending float-arms secured to the rock-shaft, and gyratory band-cutters operating between and in advance of the arms.

10. In a band-cutter and feeder, the combination with threshing mechanism, of a conveyer, a rotary retarding device disposed between the conveyer and threshing mechanism and located wholly in rear of the conveyer, said retarder comprising a shaft having projecting fingers, a guard interposed between the shaft and threshing mechanism and permitting the passage of the fingers, a support for the guard located in rear of the same and in rear of the lower portion of the retarder, the upper portion of the guard extending over the shaft and being spaced from said support, and spaced connections secured to the lower portion of the guard below said retarder-shaft, said connections being spaced from the upper end of the guard to form an exit for the straw in rear of the retarder.

11. In a band-cutter and feeder, the combination with threshing mechanism, of a conveyer, a rotary retarding device disposed between the conveyer and threshing mechanism and comprising a shaft having projecting fingers, a guard interposed between the shaft and threshing mechanism and comprising spaced plates permitting the passage of the fingers therebetween, said plates having terminal hooks at their upper ends that engage over the shaft, and a support for the guard located on the opposite side of the shaft to said guard and having spaced connections with the plates, said connections extending below the guard.

12. In a band-cutter and feeder, the combination with a conveyer, of a revoluble retarding device located in rear of the conveyer and having projecting fingers, a supporting-bar extending longitudinally of the retarding device, guard-plates extending between the fingers, and brackets connecting the plates and the supporting-bar.

13. In a band-cutter and feeder, the combination with a conveyer, of a revoluble retarding device located in rear of the conveyer and comprising a shaft carrying radially-disposed retarding-fingers, a channel-bar disposed longitudinally of the shaft, a plurality of guard-plates extending beneath the shaft and having hooked portions at their upper ends that engage over the same between the fingers, and separate brackets connecting the channel-bar and the lower ends of the guard-plates.

14. In a band-cutter and feeder, the combination with a threshing-cylinder, of a conveyer having its rear end spaced therefrom, a rotary retarding device located between the conveyer and cylinder, and spaced rearwardly-projecting stationary teeth supported beneath the retarder and having their rear ends directly adjacent to the cylinder.

15. In a band-cutter and feeder, the combination with a conveyer, of a revoluble retarding device located in rear of the conveyer, a guard extending over the retarder, supporting means for the guard, and rearwardly-projecting teeth disposed below the retarder and securing the guard to the supporting means.

16. In a band-cutter and feeder, the combination with a conveyer, of a retarder-shaft disposed in rear of the conveyer and having radially-disposed fingers, a guard comprising plates that extend between the fingers, brackets having their lower ends disposed contiguous to the lower ends of the plates, and rearwardly-projecting teeth arranged at the lower ends of the plates and comprising means for securing said plates to the brackets.

17. In a band-cutter and feeder, the combination with threshing mechanism, of a feeding-conveyer therefor, driving means for the conveyer including a clutch having a movable element, a detent for operating the movable element of the clutch to stop the conveyer, and means for holding said detent in active position with respect to the movable element when the threshing mechanism is below a predetermined speed, said means comprising a shaft, a loose member, another member fixed to the shaft, a jaw carried by the fixed member and having a friction-roller that is movable into and out of engagement with the loose member, and a connection between the said loose member and the operating means for the clutch element.

18. In a band-cutter and feeder, the combination with threshing mechanism, of a feeding-conveyer therefor, driving means for the conveyer including a clutch having a movable element, a detent for operating the movable element of the clutch to stop the conveyer, means for holding said detent in active position with relation to the movable element when the threshing mechanism is below a predetermined speed, said means comprising a shaft driven from the threshing mechanism, a member loosely mounted on the shaft and having a bearing-surface, another member fixed to the shaft adjacent to the loose member, a jaw pivoted upon the fixed member, a roller journaled on the free end of the jaw and movable into and out of engagement with the bearing-surface of the loose member, and a spring bearing against the roller for resisting the movement thereof.

19. In a band-cutter and feeder, the combination with threshing mechanism, of a feeding-conveyer therefor, driving means for the conveyer including a clutch having a movable element, a detent-rod movable into and out of the path of movement of said movable element for operating the same to stop the conveyer, and means for moving the rod into said path of movement when the threshing mechanism is below a predetermined speed, said means comprising a shaft driven from the threshing mechanism, a member loosely journaled on the shaft and having a connection with the detent-rod, said loose member also having an annular flange, another member fixed to the shaft, oppositely-disposed jaws pivoted to the fixed member, a yoke connecting the jaws, rollers journaled on the free ends of the jaws and movable into and out of engagement with the flange of the loose member, and coiled springs bearing against the rollers for resisting the movement of the same when in engagement with said flange.

20. In a band-cutter and feeder, the combination with a driving-shaft operating in one direction, means for driving the shaft, of a conveyer-shaft operating in an opposite direction, a disk loosely journaled on one shaft and having an operative connection with the other shaft, another disk fixed to the shaft carrying the loose disk, a friction-wheel located between the disks and capable of a swinging movement on an axis transversely of its axis of rotation to move its periphery toward and from the peripheries of the disks, a conveyer operated by the conveyer-shaft, and a straw-actuated float movably located over the conveyer and having a connection with the friction-wheel.

21. In a band-cutter and feeder, the combination with a driving-shaft operating in one direction, of a conveyer-shaft operating in an opposite direction, means for actuating the driving-shaft, a friction-disk fixed to the driving-shaft, another disk loosely journaled on said shaft and having a geared connection with the conveyer-shaft, a friction-wheel located between the disks and capable of a swinging movement on an axis transversely of its axis of rotation to move its periphery toward and from the peripheries of the disks, a conveyer-belt passing about the conveyer-shaft and driven thereby, and a straw-actuated float movably located over the conveyer-belt and actuated by an abnormal amount of grain thereon, said float having a connection with the friction-wheel for swinging the same.

22. In a band-cutter and feeder, the combination with a driving-shaft, of a conveyer-shaft, a friction-disk secured to the driving-shaft, a loosely-journaled friction-disk having a hub, gear connections between the hub and the conveyer-shaft, a friction-wheel interposed between the disks and having peripheral engagements with both, said friction-wheel being capable of oscillation on an axis transversely of its axis of rotation, a conveyer driven by the conveyer-shaft, and a straw-actuated float movably located over the conveyer and having a connection with the friction-wheel to oscillate the same.

23. In a band-cutter and feeder, the combination with a driving-shaft, of a conveyer-shaft, a friction-disk secured to the driving-shaft, another friction-disk loosely journaled on the driving-shaft and having a hub, a sprocket-wheel carried by the hub and located between the disks, a sprocket-chain connection with said sprocket-wheel and the conveyer-shaft, a conveyer operated by the conveyer-shaft, a straw-actuated float movably located over the conveyer, a friction-wheel having a peripheral engagement with the disks and located between the same, said wheel having a swinging movement transversely of its axis of rotation and having an operative connection with the float.

24. In a band-cutter and feeder, the combination with a suitable frame, of a conveyer, means for driving the same including speed-varying mechanism, said mechanism having rock-stems, the movement of which stems changes the speed of the mechanism, supports for said stems carried by the frame, a connection between the stems, friction-wheels carried by the stems, a straw-actuated float movably located over the conveyer, and an extensible connection between the float and stem, said connection being adjustable toward and from one of the stems for varying the amount of movement of said stems upon a predetermined movement of the float.

25. In a band-cutter and feeder, the combination with a conveyer, of means for driving the same including speed-varying mechanism, said mechanism having rock-stems, the movement of which stems varies the speed of said mechanism, journal-supports for the rock-stems, friction-wheels carried by the stems, said stems being provided with oppositely-extending arms, a connection between the arms, another arm carried by one of the stems, a straw-actuated float movably located over the conveyer, and a link having a connection with the last-mentioned arm and adjustable thereon toward and from the stem to vary the movement of the stems with respect to the movement of the float.

26. In a band-cutter and feeder, the combination with a machine-frame, of a conveyer, means for driving the same including speed-varying mechanism, said mechanism having rock-stems, the movement of which stems varies the speed of the mechanism, journal-sleeves for the rock-stems mounted on the frame, a connection between the stems, an arm carried by one of the stems and having a longitudinally-disposed slot, friction-wheels carried by the rock-stems, a swinging straw-actuated float located over the conveyer, an extensible link connected to the float, and an adjustable connection between the link and arm, said connection being adjustable in the slot thereof and varying the movement of the arm with respect to the movement of the float.

27. In a band-cutter and feeder, the combination with a threshing-cylinder, of a conveyer therefor having its rear portion spaced from the cylinder, a rotary retarder located in the space between the conveyer and cylinder, gyratory cutter-bars located and operating over the rear portion of the conveyer, the retarder and the cylinder, a rock-shaft journaled over the cutter-bars, and deflector-tines depending from the rock-shaft and extending rearwardly and downwardly between the cutter-bars and over the retarder and cylinder.

28. In a band-cutter and feeder, the combination with a casing, of a threshing-cylinder, a conveyer for feeding material to the threshing-cylinder, means for varying the speed of the conveyer, said means including a float having depending spaced arms, a deflector comprising a rock-shaft journaled transversely in the casing, and having downwardly-extending spaced tines, the lower ends of which are located adjacent to the cylinder, means for securing the rock-shaft against movement and in different positions, gyratory knife-bars operating between the tines and the float-bars and having depending cutter-blades, a crank-shaft connected with the knife-bars and located between the float-arms and tines, and suspending-links connected to the rear ends of the knife-bars in rear of the tines.

29. In a band-cutter and feeder, the combination with a conveyer, of a driving-shaft, driving and driven elements mounted on the shaft, connections between the said elements for effecting the relative variable movements thereof, means for moving the connections to vary the relative movements of the driving and driven elements, connections between the driven element and conveyer including a clutch, and means mounted on the driving-shaft for effecting the movement of the clutch.

30. In a band-cutter and feeder, the combination with a conveyer, of a driving-shaft, driving and driven elements mounted on the shaft, said driving element being fixed to the shaft, the driven element being loose thereon, connections between said elements for effecting the relative variable movement thereof, connections between the driven element and the conveyer, including a clutch, a device for operating the clutch, and a centrifugal governor mounted on the shaft and connected to the device for operating said clutch.

31. In a band-cutter and feeder, the combination with a conveyer, of a driving-shaft, a driving element fixed upon the shaft, a driven element, means interposed between the elements for effecting the relative variable movement thereof, connections between the driven elements and the conveyer including a clutch, and a governor for operating the clutch, said governor including elements mounted on and operated by the said driving element.

32. In a band-cutter and feeder, the combination with a conveyer, of a driving-shaft, a driving element fixed upon the shaft, a driven element, means interposed between the elements for effecting the relative variable movement thereof, connections between the driven element and the conveyer including a clutch, and a governor for operating the clutch, said governor including centrifugal arms mounted on and rotatable with the driving element.

33. In a band-cutter and feeder, the combination with a conveyer, of a driving-shaft, a driving element secured to the shaft, a driven element revolubly mounted on the shaft at one side of the driving element, means interposed between the elements for moving the same at variable speeds, connections between the driven element and the conveyer including a clutch, a governor element loosely mounted on the shaft on the side of the driving element opposite the loosely-mounted driven element, centrifugally-operated means carried by the driving element and coacting with the loose governor element, and means operated by the said loose governor element for actuating the clutch.

34. In a band-cutter and feeder, the combination with a conveyer, of a threshing-cylinder located in rear of the same, a rotary retarder located between the conveyer and threshing-cylinder, and a deflector-frame comprising a cross-bar, a plurality of guard-plates that coact with the retarder, and braces connecting the guard-plates and cross-bar, said braces having shanks that are curved upwardly toward the rotary retarder.

35. In a band-cutter, and feeder, the combination with a conveyer, of a threshing-cylinder, a rotary retarder having radially-disposed fingers located between the conveyer and threshing-cylinder, a plurality of guard-plates having hooked upper ends engaging over the retarder, the spaces between the plates being of sufficient width to permit the passage of the fingers, and braces connected to the lower ends of the plates beneath the retarder, said braces being narrower than the plates.

36. In a band-cutter and feeder, the combination with a conveyer, of means for controlling the movement of the conveyer including a swinging support, a cross-bar swinging with the support and adjustable upon the same toward and from its axis of movement, and a grain-actuated float suspended from the cross-bar and adjustable with the same, said float being located over the conveyer and actuated by an abnormal amount of grain carried thereon.

37. In a band-cutter and feeder, the combination with a conveyer, of a driving-shaft, a friction-disk tight upon the shaft, a friction-disk loose upon the shaft, a friction-wheel interposed between the disks, a float located over the conveyer and having connections with the friction-wheel, a conveyer-shaft, connections between the loose disk and conveyer-shaft including a clutch, and a speed-governor including an actuating device for the clutch mounted on the shaft and means for engaging and moving the actuating device, said means being carried by the fixed friction-disk.

38. In a band-cutter and feeder, the combination with a conveyer, of a driving-shaft, a friction-disk tight on the shaft, a friction-disk loose on the shaft, a friction-wheel interposed between the disks, a float located over the conveyer and having connections with the friction-wheel, a conveyer-shaft, a clutch mounted on the shaft and including a sprocket-wheel loose thereon, a chain connecting said sprocket-wheel and loose friction-disk, and a speed-governor including an actuating device for the clutch mounted on the shaft, and centrifugally-operated arms coacting with the actuating device and carried by the fixed disk.

In testimony that I claim the foregoing as my own I have hereto affixed my signature in the presence of two witnesses.

SAMUEL DUNKELBERGER.

Witnesses:
  J. H. McNAIR,
  W. J. BARKEMEYER.